(12) United States Patent
Richter et al.

(10) Patent No.: US 12,134,996 B2
(45) Date of Patent: Nov. 5, 2024

(54) ACOUSTIC LINER AND GAS TURBINE ENGINE WITH SUCH ACOUSTIC LINER

(71) Applicants: ROLLS-ROYCE DEUTSCHLAND LTD & CO KG, Blankenfelde-Mahlow (DE); ITP NEXT GENERATION TURBINES S.L., Zamudio (ES)

(72) Inventors: Christoph Richter, Blankenfelde-Mahlow (DE); Adolfo Serrano González, Madrid (ES)

(73) Assignees: ROLLS-ROYCE DEUTSCHLAND LTD & CO KG, Blankenfelde-Mahlow (DE); ITP NEXT GENERATION TURBINES S.L., Zamudio (ES)

( * ) Notice: Subject to any disclaimer, the term of this patent is extended or adjusted under 35 U.S.C. 154(b) by 206 days.

(21) Appl. No.: 17/029,245

(22) Filed: Sep. 23, 2020

(65) Prior Publication Data

US 2021/0095617 A1    Apr. 1, 2021

(30) Foreign Application Priority Data

Sep. 26, 2019  (EP) .................................. 19 199 792

(51) Int. Cl.
*F02K 1/82* (2006.01)
*B64D 33/02* (2006.01)
(Continued)

(52) U.S. Cl.
CPC .............. *F02K 1/827* (2013.01); *F01D 25/24* (2013.01); *F02C 7/045* (2013.01);
(Continued)

(58) Field of Classification Search
CPC .......... F01D 25/24; F01D 25/00; F01D 9/041; F01D 25/04; F05D 2220/323;
(Continued)

(56) References Cited

U.S. PATENT DOCUMENTS

| 7,401,682 B2 * | 7/2008 | Proscia | ................... F02K 1/827 239/265.17 |
| 7,784,283 B2 * | 8/2010 | Yu | ............................. F02K 1/04 60/770 |

(Continued)

FOREIGN PATENT DOCUMENTS

| EP | 3091216 A1 | 11/2016 |
| GB | 2005384 A | 4/1979 |

(Continued)

OTHER PUBLICATIONS

European Search Report dated Mar. 9, 2020 from counterpart European Patent Application No. 19199792.3.

(Continued)

*Primary Examiner* — Woody A Lee, Jr.
*Assistant Examiner* — Eric A Lange
(74) *Attorney, Agent, or Firm* — SHUTTLEWORTH & INGERSOLL, PLC; Timothy J. Klima

(57) ABSTRACT

The invention regards an acoustic liner which comprises: a facing sheet that comprises holes, the facing sheet having a porosity and a facing sheet thickness, a backing sheet, and a plurality of cells arranged between the facing sheet and the backing sheet, the cells having a cell depth and each cell defining a cavity. A plurality of internal necks are provided that extend from the inner side of the facing sheet towards the backing sheet, each internal neck being located around a hole of the facing sheet, thereby extending the longitudinal length of the hole. The invention further regards a gas turbine engine with such acoustic liner.

17 Claims, 8 Drawing Sheets

(51) Int. Cl.
   *F01D 25/24* (2006.01)
   *F02C 7/045* (2006.01)
(52) U.S. Cl.
   CPC ............... *B64D 2033/0206* (2013.01); *F05D 2220/323* (2013.01); *F05D 2240/12* (2013.01); *F05D 2250/283* (2013.01)
(58) Field of Classification Search
   CPC .......... F05D 2240/12; F05D 2250/283; F05D 2260/96; F05D 2260/963; F02K 1/827; F02C 7/045; F02C 7/24; B64D 2033/0206; Y02T 50/60; G10K 11/172
   See application file for complete search history.

(56) References Cited

U.S. PATENT DOCUMENTS

| | | | |
|---|---|---|---|
| 9,103,216 B2* | 8/2015 | Kennepohl | F01D 5/18 |
| 2002/0036115 A1* | 3/2002 | Wilson | F02C 7/045 |
| | | | 181/290 |
| 2005/0284690 A1* | 12/2005 | Proscia | G10K 11/172 |
| | | | 181/210 |
| 2012/0090693 A1 | 4/2012 | Chelin et al. | |
| 2015/0369127 A1 | 12/2015 | Gilson et al. | |
| 2018/0018952 A1 | 1/2018 | Herrera | |
| 2019/0337632 A1* | 11/2019 | Berry | F02C 7/045 |

FOREIGN PATENT DOCUMENTS

| | | | | |
|---|---|---|---|---|
| GB | 2024380 A | * | 1/1980 | ........... G10K 11/172 |
| GB | 2361035 A | * | 10/2001 | ............. F01D 5/147 |
| GB | 2452476 B | * | 1/2010 | ............ B22F 3/1055 |
| GB | 2471845 A | | 1/2011 | |

OTHER PUBLICATIONS

Joe Walsh, "Progress in Engine Noise Reduction and future Challenges", Greener by Design Conference, Oct. 17-18, 2016.

Bruce G. McKay et al., "The UltraFan Engine and Aircraft Based Thrust Reversing", 48h AIAA/ASME/SAE/ASEE Joint Propulsion Conference & Exhibit, Jul. 30-Aug. 1, 2012.

Office Action dated Feb. 27, 2023 from counterpart EP App No. 19199792.3.

* cited by examiner

ACOUSTIC LINER AND GAS TURBINE ENGINE WITH SUCH ACOUSTIC LINER

REFERENCE TO RELATED APPLICATION

This application claims priority to European Patent Application No. 19 199 792.3 filed on Sep. 26, 2020, the entirety of which is incorporated by reference herein.

BACKGROUND

The present disclosure relates to an acoustic liner and a gas turbine engine with such acoustic liner.

Acoustic liners and their use in gas turbine engines for acoustic treatment are well known. Acoustic liners typically consist of a perforated facing sheet, a backing sheet and a plurality of cells arranged between the facing sheet and the backing sheet. The cells have a cell depth and each define a cavity.

Generally, two damping mechanisms are effective in an acoustic liner, one being resistive damping caused by the conversion of acoustic energy of the incident sound waves into heat by causing particle oscillations in the pores of the absorber material, and the other being reactive cancellation in which incident sound waves are extinguished by waves reflected from the backing sheet. For reactive cancellation, only wavelengths of a certain range are cancelled depending on the depth of the individual cells of the acoustic liner. More particularly, incoming waves are absorbed by interference if the cell depth is equal to $\lambda/4$ or an odd-numbered multiple of $\lambda/4$, with $\lambda$ being the wavelength of the sound waves. Acoustic cells that absorb sound waves with a wavelength of $\lambda$ are also called $\lambda/4$ resonators or $\lambda/4$ absorbers. They absorb sound waves in a relatively narrow frequency range which lies around the resonant frequency of the cells. Accordingly, the thickness of an acoustic liner depends on the dominant frequency range of the noise that shall be attenuated. Both resistive damping and reactive cancellation are present in a damping process.

There is an ongoing need to improve the reduction of noise of a gas turbine engine and, accordingly, an ongoing need to improve the quality of acoustic liners. For example, noise reduction is a particular challenge in a gas turbine engine in which the speed of the turbines is increased, such as in a geared gas turbine engine, and/or in a gas turbine engine in which the length of the nacelle is a decreased. There is a particular challenge if the noise that has to be reduced has relatively low frequencies as relatively low frequencies result in a required larger cell depth for $\lambda/4$ absorption and thus thicker acoustic liners. However, available space for attachment of acoustic liners is limited in a gas turbine engine, in particular in the turbine and nozzle sections of a gas turbine engine.

Document US 2015/0369127 A1 discloses a geared gas turbine engine in which a plurality of discrete acoustic liner segments with varied geometric properties are disposed along the bypass duct of the engine. Document US 2018/0018952 A1 discusses the use of 3D-printing when manufacturing acoustic liners.

There is a need to provide for a low profile acoustic liner which is suitable to mitigate turbine tones generated in the turbine section of a geared gas turbine engine. Further, a gas turbine engine shall be provided with reduced noise level from the turbine section.

SUMMARY

According to first aspect of the invention, an acoustic liner is provided which comprises a facing sheet, a backing sheet and a plurality of cells arranged between the facing sheet and the backing sheet. The cells have a cell depth and each define a cavity. The facing sheet comprises a plurality of holes which define the porosity of the facing sheet, the porosity being defined by the ratio of the open area of the facing sheet (defined by the holes) to the overall area of the facing sheet. The facing sheet further has a facing sheet thickness.

A plurality of internal necks extending from the inner side of the facing sheet towards the backing sheet are provided, each internal neck being located around a hole of the facing sheet, thereby extending the longitudinal length of the hole. Accordingly, the longitudinal length of the hole is partly defined by the facing sheet thickness and partly defined by the length of the internal neck.

The first aspect of the invention is thus based on the idea to provide for an extension of the longitudinal length of the holes provided in the facing sheet without increasing the overall thickness of the facing sheet. Instead, necks, which may also be referred to as projecting rims, are located around the holes and extend from the inner side of the facing sheet towards the backing sheet. By increasing the longitudinal length of the holes, the vibrating column of air that is located in the holes is extended in length. Accordingly, the air mass that is oscillating is increased. This again decreases the resonance frequency at which absorption of sound waves is at a maximum.

In other words, the inertance of the air mass in the facing sheet is increased, thereby reducing the resonance frequency. In particular, according to a simplified physical model, the resonance frequency $f_{res}$ is proportional to the root from $1/L_2$, $L_2$ being the length of the hole and, thus, the length of the air column in the hole. Accordingly, the resonance frequency decreases if the length of hole increases.

This aspect of the invention allows to substantially reduce the resonance frequency at which the absorption of the acoustic liner is at a maximum compared to the $\lambda/4$ resonance frequency solely defined by the cell depth. In embodiments, peak attenuation is less than $\frac{1}{5}$ of the $\lambda/4$ resonance frequency of the liner cell depth (at a temperature the liner was designed for, such as the temperature present at a location of the turbine section of a jet engine). Such reduction of the resonance frequency is achieved without the need to provide for a thick facing sheet which would negatively add to weight, specific fuel consumption and occupation of space. Instead, by providing local necks around the holes in the facing sheet, the facing sheet can be kept relatively thin while at the same time providing for an extended longitudinal length of the holes.

Aspects of the invention thus provide for a low profile acoustic liner which is substantially thinner than prior art acoustic liners. Such liner can be implemented particularly in a geared gas turbine engine, in particular the turbine section of a geared gas turbine engine. However, in principle, such liner can be implemented in any part of a gas turbine engine in which a low profile acoustic liner panel is of advantage, in particular where conventional panels require a much larger thickness at high temperatures (the conventional $\lambda/4$ cell depth increases with temperature as the sound velocity increases with temperature).

According to an embodiment, the facing sheet has a porosity in the range between 1% and 4%. In particular, the porosity of the facing sheet may be equal to or smaller than 3%. According to this aspect, a very low porosity of the facing sheet is implemented. By reducing the porosity, i.e., the open area of the facing sheet, a high facing sheet air mass inertance is provided for and, accordingly, the resonance frequency is further decreased.

According to a further embodiment, the facing sheet thickness is in the range between 0.3 and 2 mm. For example, the facing sheet thickness is in the range between 0.4 and 0.6 mm. As discussed, by providing internal necks around the holes in the facing sheet, the facing sheet thickness can be reduced to small values of about 0.5 mm. However, to further increase the length of the air column in the holes, in addition, the sheet thickness may be increased to up to 2 mm.

In a further embodiment, the cell depth of the cells is in the range between 2 and 5 mm. For example, the cell depth of the cells is equal to or smaller than 3.5 mm. Accordingly, a very low cell depth is provided for, considering that, in embodiments of the invention, the acoustic liner is adapted to have its peak attenuation at a frequency that lies in the range between 4.000 Hz and 8.000 Hz. In particular, the frequency range in which the liner is adapted to have its peak attenuation may be between 5.000 Hz and 7.000 Hz, in particular between 5.500 Hz and 6.500 Hz. The bandwidth, in which the liner realizes a peak attenuation, may be about 500 Hz in embodiments. The very low cell depth can be achieved by implementing the necks that increase the longitudinal length of the cells without increasing the facing sheet thickness. In embodiments, the neck may have a length up to 2 mm.

It is pointed out that the frequency at which the acoustic liner has its peak attenuation depends on the sound velocity which is dependent on temperature. For the mentioned peak attenuation at a frequency that lies in the range between 4.000 Hz and 8.000 Hz a hot working condition of the gas turbine engine in which the acoustic liner is present is assumed in which the sound velocity is 600 m/s. It is pointed out that this does not necessarily mean that the sound velocity is 600 m/s. It just means that the frequency range between 4.000 Hz and 8.000 Hz in which the peak attenuation lies refers to a sound velocity of 600 m/s. If the sound velocity is, e.g., lower, the mentioned frequency range changes accordingly.

The neck may be formed hollow cylindrical. This is associated with the advantage that the neck is a straight extension of the respective hole in the facing sheet. However, in principle, the neck may have other forms such as the form of a torus.

According to an embodiment, the holes in the facing sheet have a diameter in the range between 0.1 mm and 1.6 mm. In particular, the holes may have a diameter equal to or smaller than 1.0 mm. If the holes are not circular, which may be the case in embodiments, the diameter is the largest diameter of the hole. By providing for a small hole diameter, the facing sheet air mass inertance is further increased and the resonance frequency is further decreased.

In a further embodiment, the diameter of the cells is in the range between 5 mm and 20 mm. in particular, the diameter of the cells may be in the range between 8 mm and 12 mm. If the cells are not circular, which typically is the case, the diameter is the largest diameter of the cell.

Generally, the acoustic liner is designed in sandwich construction, with the facing sheet on the outside of a cell layer and the backing sheet on the inside. The backing sheet is of rigid nature in the sense that it reflects the incoming sound waves. It may also take on structural tasks. The cells may be prismatic cells and formed as a honeycomb structure. Instead of a hexagonal honeycomb structure, square, rectangular, rhombic or complex cell structures are also possible according to the present invention. Also, cells with a circular cross-section may be implemented.

If the cells of the acoustic liner are arranged in a honeycomb structure, the walls of the honeycomb structure may have a wall thickness in the range between 0.05 and 1 mm.

Generally, when referring to a range or interval, the boundary values of the range/interval are also included in the range/interval.

According to a further aspect, each cell of the acoustic liner is associated with a plurality of holes in the facing sheet. For example, the holes in the facing sheet are arranged such that three or more, e.g., between three and six holes are associated which each cell. The holes may be arranged in a certain geometric configuration such as, in the case of six holes, in a hexagonal form, or, in the case of five holes, in a cross-like form. Each of the holes of each cell comprises an internal neck. By implementing a plurality of holes and associated internal necks in each cell, a low porosity of the facing sheet and small hole diameters can be implemented.

The overall thickness of the liner including the thickness of the facing sheet and the thickness of the backing sheet may be in the range between 2 mm and 6 mm, in particular in the range between 3 mm and 5 mm, according to aspects of the present invention.

In a further aspect of the invention, at least the facing sheet that includes the plurality of internal necks is manufactured by 3D printing. In embodiments, the complete acoustic liner is manufactured by 3D printing, including the backing sheet, the cells and the facing sheet. By implementing 3D printing, the neck can be provided for in an exact and efficient manner around the holes in the facing sheet. The acoustic liner may be printed from an organic material or a plastic material in embodiments. In other embodiments, the acoustic liner is printed from a nickel-base alloy.

However, the acoustic liner of the present invention is not limited to any particular method of manufacture. For example, in alternative embodiments, the acoustic liner may be a sintered material. More particularly, the acoustic liner may alternatively be formed by metal injection molding and sintering.

When manufacturing the acoustic liner by means of 3D printing, in an embodiment, the backing sheet comprises holes which are sized such that powder from the cells produced during 3D printing can be removed through such holes. The holes are sized and provided in an amount such that the rigid nature of the backing sheet required for reflecting the acoustic waves is not negatively affected by the holes.

In an embodiment, the facing sheet is a single layer facing sheet. Accordingly, the facing sheet does not comprise several layers separated by a gap. A single degree of freedom regarding the single layer is provided for. Each of the holes of the single layer facing sheet is associated with an internal neck. Use of a single layer allows to provide for a clearly defined porosity of the facing sheet and further facilitates manufacture of the acoustic liner.

According to a second aspect of the invention, a gas turbine engine is provided for. The gas turbine engine comprises an engine core with a compressor, a combustion equipment and a turbine. An acoustic liner in accordance with the present invention is provided for and attached to at least one surface of the turbine.

According to this aspect of the invention, the acoustic liner of the present invention is located in the turbine section of a gas turbine engine. As the acoustic liner has a low profile, it can be implemented in an efficient manner in such turbine section. The acoustic liner may be implemented in the high-pressure turbine and/or the low-pressure turbine.

In an example embodiment, the acoustic liner is attached to an annular structure surrounding the main gas path through the turbine. For example, it is attached to an outer annular structure and/or an inner annular structure surrounding the main gas path through the turbine. In an embodiment, it may be attached to an annulus structure of the low-pressure turbine of the turbine section. For example, it may be attached to an annulus structure of the outlet guide vane (OGV) of the most downstream turbine (the low-pressure turbine).

In another embodiment, the acoustic liner is attached to struts or guide vanes of the turbine. For example, it may be attached to the outlet guide vanes of the low-pressure turbine. The acoustic liner may be attached to the pressure side and/or the suction side of the guide vanes.

The acoustic liner may be attached to struts or guide vanes by welding, bolting or gluing according to different embodiments.

The gas turbine engine may be a geared gas turbine engine. Accordingly, the gas turbine engine further comprises a core shaft connecting the turbine to the compressor, a fan located upstream of the engine core, and a gearbox that receives an input from the core shaft and outputs drive to the fan so as to drive the fan at a lower rotational speed than the core shaft. In a geared gas turbine engine, due to the higher-speed and smaller diameter of the turbine, a low noise cut off design of the turbine is challenging to achieve. It is, therefore, of advantage to implement the acoustic panel in the turbine section of a geared gas turbine engine.

In an embodiment,
the turbine is a first turbine, the compressor is a first compressor, and the core shaft is a first core shaft;
the engine core further comprises a second turbine, a second compressor, and a second core shaft connecting the second turbine to the second compressor; and
the second turbine, second compressor, and second core shaft are arranged to rotate at a higher rotational speed than the first core shaft.

The present disclosure further encompasses a gas turbine engine for an aircraft which comprises guide vanes in a compressor section and in a turbine section of the gas turbine engine. It is provided that an acoustical liner, which may be an acoustic liner in accordance with the present invention, is attached to struts and/or to guide vanes of at least one guide wheel in at least one of the compressor section and the turbine section of the gas turbine engine.

This aspect is based on the idea to place an acoustic liner directly on a guide vane or a strut. Thereby, the production of noise is reduced at an early stage before the propagating sound waves are reflected at the boundaries of the gas path. This aspect, therefore, provides for effective noise reduction. The acoustic liner may be any acoustic liner.

It should be noted that the present invention is described in terms of a cylindrical coordinate system having the coordinates x, r and φ. Here x indicates the axial direction, r the radial direction and φ the angle in the circumferential direction. The axial direction is defined by the machine axis of the gas turbine engine in which the acoustic liner of the present invention is implemented, with the axial direction pointing from the engine inlet to the engine outlet. The axial direction of the planetary gearbox is identical to the axial direction of the gas turbine engine. Starting from the x-axis, the radial direction points radially outwards. Terms such as "in front of" and "behind" refer to the axial direction or flow direction in the engine. Terms such as "outer" or "inner" refer to the radial direction.

As noted elsewhere herein, the present disclosure may relate to a gas turbine engine. Such a gas turbine engine may comprise an engine core comprising a turbine, a combustor, a compressor, and a core shaft connecting the turbine to the compressor. Such a gas turbine engine may comprise a fan (having fan blades) located upstream of the engine core.

Arrangements of the present disclosure may be particularly, although not exclusively, beneficial for fans that are driven via a gearbox. Accordingly, the gas turbine engine may comprise a gearbox that receives an input from the core shaft and outputs drive to the fan so as to drive the fan at a lower rotational speed than the core shaft. The input to the gearbox may be directly from the core shaft, or indirectly from the core shaft, for example via a spur shaft and/or gear. The core shaft may rigidly connect the turbine and the compressor, such that the turbine and compressor rotate at the same speed (with the fan rotating at a lower speed).

The gas turbine engine as described and/or claimed herein may have any suitable general architecture. For example, the gas turbine engine may have any desired number of shafts that connect turbines and compressors, for example one, two or three shafts. Purely by way of example, the turbine connected to the core shaft may be a first turbine, the compressor connected to the core shaft may be a first compressor, and the core shaft may be a first core shaft. The engine core may further comprise a second turbine, a second compressor, and a second core shaft connecting the second turbine to the second compressor. The second turbine, second compressor, and second core shaft may be arranged to rotate at a higher rotational speed than the first core shaft.

In such an arrangement, the second compressor may be positioned axially downstream of the first compressor. The second compressor may be arranged to receive (for example directly receive, for example via a generally annular duct) flow from the first compressor.

The gearbox may be arranged to be driven by the core shaft that is configured to rotate (for example in use) at the lowest rotational speed (for example the first core shaft in the example above). For example, the gearbox may be arranged to be driven only by the core shaft that is configured to rotate (for example in use) at the lowest rotational speed (for example only be the first core shaft, and not the second core shaft, in the example above). Alternatively, the gearbox may be arranged to be driven by any one or more shafts, for example the first and/or second shafts in the example above.

In any gas turbine engine as described and/or claimed herein, a combustor may be provided axially downstream of the fan and compressor(s). For example, the combustor may be directly downstream of (for example at the exit of) the second compressor, where a second compressor is provided. By way of further example, the flow at the exit to the combustor may be provided to the inlet of the second turbine, where a second turbine is provided. The combustor may be provided upstream of the turbine(s).

The or each compressor (for example the first compressor and second compressor as described above) may comprise any number of stages, for example multiple stages. Each stage may comprise a row of rotor blades and a row of stator vanes, which may be variable stator vanes (in that their angle of incidence may be variable). The row of rotor blades and the row of stator vanes may be axially offset from each other.

The or each turbine (for example the first turbine and second turbine as described above) may comprise any number of stages, for example multiple stages. Each stage may comprise a row of rotor blades and a row of stator vanes. The row of rotor blades and the row of stator vanes may be axially offset from each other.

Each fan blade may be defined as having a radial span extending from a root (or hub) at a radially inner gas-washed location, or 0% span position, to a tip at a 100% span position. The ratio of the radius of the fan blade at the hub to the radius of the fan blade at the tip may be less than (or on the order of) any of: 0.4, 0.39, 0.38 0.37, 0.36, 0.35, 0.34, 0.33, 0.32, 0.31, 0.3, 0.29, 0.28, 0.27, 0.26, or 0.25. The ratio of the radius of the fan blade at the hub to the radius of the fan blade at the tip may be in an inclusive range bounded by any two of the values in the previous sentence (i.e. the values may form upper or lower bounds). These ratios may commonly be referred to as the hub-to-tip ratio. The radius at the hub and the radius at the tip may both be measured at the leading edge (or axially forwardmost) part of the blade. The hub-to-tip ratio refers, of course, to the gas-washed portion of the fan blade, i.e. the portion radially outside any platform.

The radius of the fan may be measured between the engine centreline and the tip of a fan blade at its leading edge. The fan diameter (which may simply be twice the radius of the fan) may be greater than (or on the order of) any of: 250 cm (around 100 inches), 260 cm, 270 cm (around 105 inches), 280 cm (around 110 inches), 290 cm (around 115 inches), 300 cm (around 120 inches), 310 cm, 320 cm (around 125 inches), 330 cm (around 130 inches), 340 cm (around 135 inches), 350 cm, 360 cm (around 140 inches), 370 cm (around 145 inches), 380 (around 150 inches) cm or 390 cm (around 155 inches). The fan diameter may be in an inclusive range bounded by any two of the values in the previous sentence (i.e. the values may form upper or lower bounds).

The rotational speed of the fan may vary in use. Generally, the rotational speed is lower for fans with a higher diameter. Purely by way of non-limitative example, the rotational speed of the fan at cruise conditions may be less than 2500 rpm, for example less than 2300 rpm. Purely by way of further non-limitative example, the rotational speed of the fan at cruise conditions for an engine having a fan diameter in the range of from 250 cm to 300 cm (for example 250 cm to 280 cm) may be in the range of from 1700 rpm to 2500 rpm, for example in the range of from 1800 rpm to 2300 rpm, for example in the range of from 1900 rpm to 2100 rpm. Purely by way of further non-limitative example, the rotational speed of the fan at cruise conditions for an engine having a fan diameter in the range of from 320 cm to 380 cm may be in the range of from 1200 rpm to 2000 rpm, for example in the range of from 1300 rpm to 1800 rpm, for example in the range of from 1400 rpm to 1600 rpm.

In use of the gas turbine engine, the fan (with associated fan blades) rotates about a rotational axis. This rotation results in the tip of the fan blade moving with a velocity Utip. The work done by the fan blades 13 on the flow results in an enthalpy rise dH of the flow. A fan tip loading may be defined as dH/Utip2, where dH is the enthalpy rise (for example the 1-D average enthalpy rise) across the fan and Utip is the (translational) velocity of the fan tip, for example at the leading edge of the tip (which may be defined as fan tip radius at leading edge multiplied by angular speed). The fan tip loading at cruise conditions may be greater than (or on the order of) any of: 0.3, 0.31, 0.32, 0.33, 0.34, 0.35, 0.36, 0.37, 0.38, 0.39 or 0.4 (all units in this paragraph being Jkg-1K-1/(ms-1)2). The fan tip loading may be in an inclusive range bounded by any two of the values in the previous sentence (i.e. the values may form upper or lower bounds).

Gas turbine engines in accordance with the present disclosure may have any desired bypass ratio, where the bypass ratio is defined as the ratio of the mass flow rate of the flow through the bypass duct to the mass flow rate of the flow through the core at cruise conditions. In some arrangements the bypass ratio may be greater than (or on the order of) any of the following: 10, 10.5, 11, 11.5, 12, 12.5, 13, 13.5, 14, 14.5, 15, 15.5, 16, 16.5, or 17. The bypass ratio may be in an inclusive range bounded by any two of the values in the previous sentence (i.e. the values may form upper or lower bounds). The bypass duct may be substantially annular. The bypass duct may be radially outside the core engine. The radially outer surface of the bypass duct may be defined by a nacelle and/or a fan case.

The overall pressure ratio of a gas turbine engine as described and/or claimed herein may be defined as the ratio of the stagnation pressure upstream of the fan to the stagnation pressure at the exit of the highest pressure compressor (before entry into the combustor). By way of non-limitative example, the overall pressure ratio of a gas turbine engine as described and/or claimed herein at cruise may be greater than (or on the order of) any of the following: 35, 40, 45, 50, 55, 60, 65, 70, 75. The overall pressure ratio may be in an inclusive range bounded by any two of the values in the previous sentence (i.e. the values may form upper or lower bounds).

Specific thrust of an engine may be defined as the net thrust of the engine divided by the total mass flow through the engine. At cruise conditions, the specific thrust of an engine described and/or claimed herein may be less than (or on the order of) any of the following: 110 Nkg-1s, 105 Nkg-1s, 100 Nkg-1s, 95 Nkg-1s, 90 Nkg-1s, 85 Nkg-1s or 80 Nkg-1s. The specific thrust may be in an inclusive range bounded by any two of the values in the previous sentence (i.e. the values may form upper or lower bounds). Such engines may be particularly efficient in comparison with conventional gas turbine engines.

A gas turbine engine as described and/or claimed herein may have any desired maximum thrust. Purely by way of non-limitative example, a gas turbine as described and/or claimed herein may be capable of producing a maximum thrust of at least (or on the order of) any of the following: 160 kN, 170 kN, 180 kN, 190 kN, 200 kN, 250 kN, 300 kN, 350 kN, 400 kN, 450 kN, 500 kN, or 550 kN. The maximum thrust may be in an inclusive range bounded by any two of the values in the previous sentence (i.e. the values may form upper or lower bounds). The thrust referred to above may be the maximum net thrust at standard atmospheric conditions at sea level plus 15 deg C. (ambient pressure 101.3 kPa, temperature 30 deg C.), with the engine static.

In use, the temperature of the flow at the entry to the high pressure turbine may be particularly high. This temperature, which may be referred to as TET, may be measured at the exit to the combustor, for example immediately upstream of the first turbine vane, which itself may be referred to as a nozzle guide vane. At cruise, the TET may be at least (or on the order of) any of the following: 1400K, 1450K, 1500K, 1550K, 1600K or 1650K. The TET at cruise may be in an inclusive range bounded by any two of the values in the previous sentence (i.e. the values may form upper or lower bounds). The maximum TET in use of the engine may be, for example, at least (or on the order of) any of the following: 1700K, 1750K, 1800K, 1850K, 1900K, 1950K or 2000K. The maximum TET may be in an inclusive range bounded by any two of the values in the previous sentence (i.e. the values may form upper or lower bounds). The maximum TET may occur, for example, at a high thrust condition, for example at a maximum take-off (MTO) condition.

A fan blade and/or aerofoil portion of a fan blade described and/or claimed herein may be manufactured from any suitable material or combination of materials. For example, at least a part of the fan blade and/or aerofoil may be manufactured at least in part from a composite, for example a metal matrix composite and/or an organic matrix composite, such as carbon fibre. By way of further example at least a part of the fan blade and/or aerofoil may be manufactured at least in part from a metal, such as a titanium based metal or an aluminium based material (such as an aluminium-lithium alloy) or a steel based material. The fan blade may comprise at least two regions manufactured using different materials. For example, the fan blade may have a protective leading edge, which may be manufactured using a material that is better able to resist impact (for example from birds, ice or other material) than the rest of the blade. Such a leading edge may, for example, be manufactured using titanium or a titanium-based alloy. Thus, purely by way of example, the fan blade may have a carbon-fibre or aluminium based body (such as an aluminium lithium alloy) with a titanium leading edge.

A fan as described and/or claimed herein may comprise a central portion, from which the fan blades may extend, for example in a radial direction. The fan blades may be attached to the central portion in any desired manner. For example, each fan blade may comprise a fixture which may engage a corresponding slot in the hub (or disc). Purely by way of example, such a fixture may be in the form of a dovetail that may slot into and/or engage a corresponding slot in the hub/disc in order to fix the fan blade to the hub/disc. By way of further example, the fan blades may be formed integrally with a central portion. Such an arrangement may be referred to as a blisk or a bling. Any suitable method may be used to manufacture such a blisk or bling. For example, at least a part of the fan blades may be machined from a block and/or at least part of the fan blades may be attached to the hub/disc by welding, such as linear friction welding.

The gas turbine engines described and/or claimed herein may or may not be provided with a variable area nozzle (VAN). Such a variable area nozzle may allow the exit area of the bypass duct to be varied in use. The general principles of the present disclosure may apply to engines with or without a VAN.

The fan of a gas turbine as described and/or claimed herein may have any desired number of fan blades, for example 16, 18, 20, or 22 fan blades.

As used herein, cruise conditions may mean cruise conditions of an aircraft to which the gas turbine engine is attached. Such cruise conditions may be conventionally defined as the conditions at mid-cruise, for example the conditions experienced by the aircraft and/or engine at the midpoint (in terms of time and/or distance) between top of climb and start of decent.

Purely by way of example, the forward speed at the cruise condition may be any point in the range of from Mach 0.7 to 0.9, for example 0.75 to 0.85, for example 0.76 to 0.84, for example 0.77 to 0.83, for example 0.78 to 0.82, for example 0.79 to 0.81, for example on the order of Mach 0.8, on the order of Mach 0.85 or in the range of from 0.8 to 0.85. Any single speed within these ranges may be the cruise condition. For some aircraft, the cruise conditions may be outside these ranges, for example below Mach 0.7 or above Mach 0.9.

Purely by way of example, the cruise conditions may correspond to standard atmospheric conditions at an altitude that is in the range of from 10000 m to 15000 m, for example in the range of from 10000 m to 12000 m, for example in the range of from 10400 m to 11600 m (around 38000 ft), for example in the range of from 10500 m to 11500 m, for example in the range of from 10600 m to 11400 m, for example in the range of from 10700 m (around 35000 ft) to 11300 m, for example in the range of from 10800 m to 11200 m, for example in the range of from 10900 m to 11100 m, for example on the order of 11000 m. The cruise conditions may correspond to standard atmospheric conditions at any given altitude in these ranges.

Purely by way of example, the cruise conditions may correspond to: a forward Mach number of 0.8; a pressure of 23000 Pa; and a temperature of −55 deg C.

As used anywhere herein, "cruise" or "cruise conditions" may mean the aerodynamic design point. Such an aerodynamic design point (or ADP) may correspond to the conditions (comprising, for example, one or more of the Mach Number, environmental conditions and thrust requirement) for which the fan is designed to operate. This may mean, for example, the conditions at which the fan (or gas turbine engine) is designed to have optimum efficiency.

In use, a gas turbine engine described and/or claimed herein may operate at the cruise conditions defined elsewhere herein. Such cruise conditions may be determined by the cruise conditions (for example the mid-cruise conditions) of an aircraft to which at least one (for example 2 or 4) gas turbine engine may be mounted in order to provide propulsive thrust.

The skilled person will appreciate that except where mutually exclusive, a feature or parameter described in relation to any one of the above aspects may be applied to any other aspect. Furthermore, except where mutually exclusive, any feature or parameter described herein may be applied to any aspect and/or combined with any other feature or parameter described herein.

BRIEF DESCRIPTION OF THE DRAWINGS

The invention will be explained in more detail on the basis of exemplary embodiments with reference to the accompanying drawings in which.

DETAILED DESCRIPTION

Figure 1:
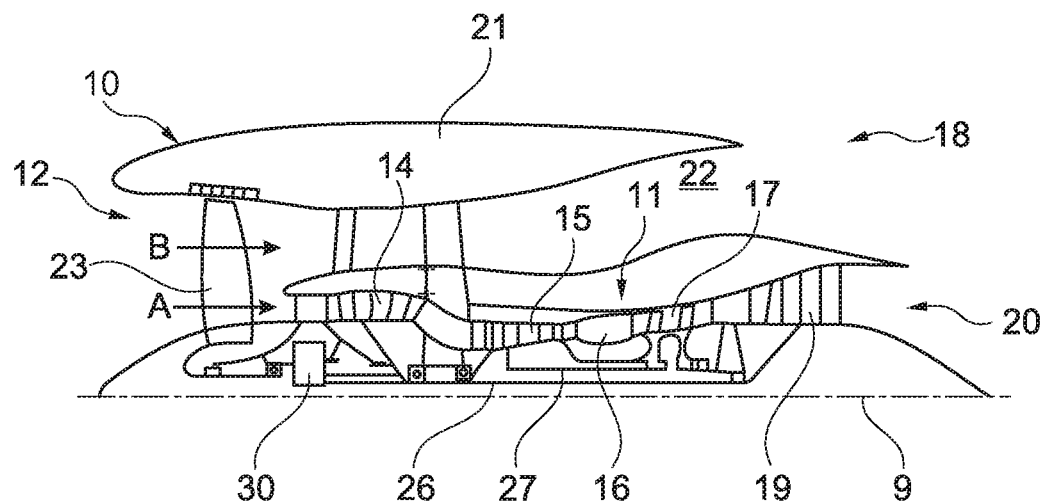
FIG. 1 is a sectional side view of a gas turbine engine.

FIG. 1 illustrates a gas turbine engine 10 having a principal rotational axis 9. The engine 10 comprises an air intake 12 and a propulsive fan 23 that generates two airflows: a core airflow A and a bypass airflow B. The gas turbine engine 10 comprises a core 11 that receives the core airflow A. The engine core 11 comprises, in axial flow series, a low pressure compressor 14, a high-pressure compressor 15, combustion equipment 16, a high-pressure turbine 17, a low pressure turbine 19 and a core exhaust nozzle 20. A nacelle 21 surrounds the gas turbine engine 10 and defines a bypass duct 22 and a bypass exhaust nozzle 18. The bypass airflow B flows through the bypass duct 22. The fan 23 is attached to and driven by the low pressure turbine 19 via a shaft 26 and an epicyclic gearbox 30.

In use, the core airflow A is accelerated and compressed by the low pressure compressor 14 and directed into the high pressure compressor 15 where further compression takes place. The compressed air exhausted from the high pressure compressor 15 is directed into the combustion equipment 16 where it is mixed with fuel and the mixture is combusted. The resultant hot combustion products then expand through, and thereby drive, the high pressure and low pressure turbines 17, 19 before being exhausted through the nozzle 20 to provide some propulsive thrust. The high pressure turbine 17 drives the high pressure compressor 15 by a suitable interconnecting shaft 27. The fan 23 generally provides the majority of the propulsive thrust. The epicyclic gearbox 30 is a reduction gearbox.

Figure 2:
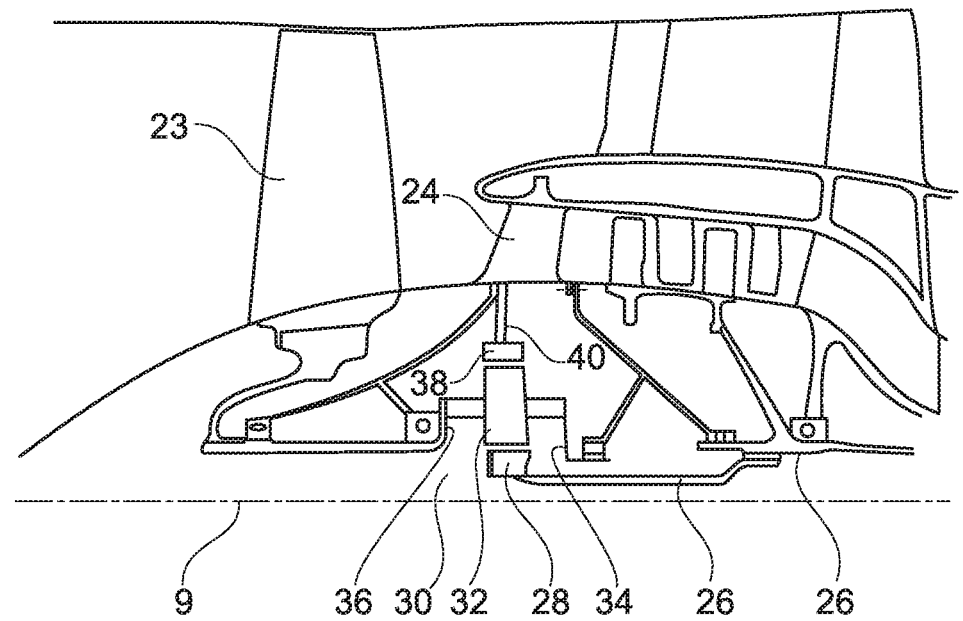
FIG. 2 is a close up sectional side view of an upstream portion of a gas turbine engine.

An exemplary arrangement for a geared fan gas turbine engine 10 is shown in FIG. 2. The low pressure turbine 19 (see FIG. 1) drives the shaft 26, which is coupled to a sun wheel, or sun gear, 28 of the epicyclic gear arrangement 30. Radially outwardly of the sun gear 28 and intermeshing therewith is a plurality of planet gears 32 that are coupled together by a planet carrier 34. The planet carrier 34 constrains the planet gears 32 to process around the sun gear 28 in synchronicity whilst enabling each planet gear 32 to rotate about its own axis. The planet carrier 34 is coupled via linkages 36 to the fan 23 in order to drive its rotation about the engine axis 9. Radially outwardly of the planet gears 32 and intermeshing therewith is an annulus or ring gear 38 that is coupled, via linkages 40, to a stationary supporting structure 24.

Note that the terms "low pressure turbine" and "low pressure compressor" as used herein may be taken to mean the lowest pressure turbine stages and lowest pressure compressor stages (i.e. not including the fan 23) respectively and/or the turbine and compressor stages that are connected together by the interconnecting shaft 26 with the lowest rotational speed in the engine (i.e. not including the gearbox output shaft that drives the fan 23). In some literature, the "low pressure turbine" and "low pressure compressor" referred to herein may alternatively be known as the "intermediate pressure turbine" and "intermediate pressure compressor". Where such alternative nomenclature is used, the fan 23 may be referred to as a first, or lowest pressure, compression stage.

Figure 3:
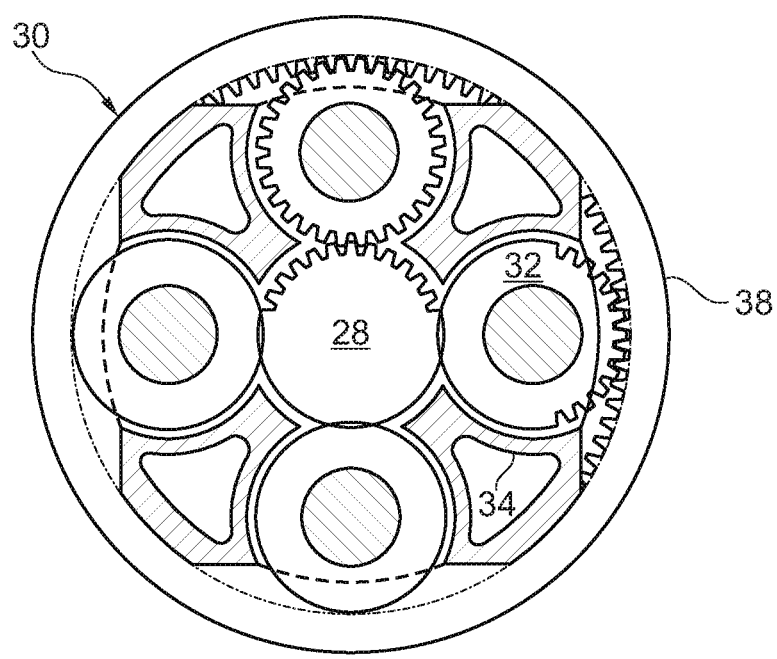
FIG. 3 is a partially cut-away view of a gearbox for a gas turbine engine.

The epicyclic gearbox 30 is shown by way of example in greater detail in FIG. 3. Each of the sun gear 28, planet gears 32 and ring gear 38 comprise teeth about their periphery to intermesh with the other gears. However, for clarity only exemplary portions of the teeth are illustrated in FIG. 3. There are four planet gears 32 illustrated, although it will be apparent to the skilled reader that more or fewer planet gears 32 may be provided within the scope of the claimed invention. Practical applications of a planetary epicyclic gearbox 30 generally comprise at least three planet gears 32.

The epicyclic gearbox 30 illustrated by way of example in FIGS. 2 and 3 is of the planetary type, in that the planet carrier 34 is coupled to an output shaft via linkages 36, with the ring gear 38 fixed. However, any other suitable type of epicyclic gearbox 30 may be used. By way of further example, the epicyclic gearbox 30 may be a star arrangement, in which the planet carrier 34 is held fixed, with the ring (or annulus) gear 38 allowed to rotate. In such an arrangement the fan 23 is driven by the ring gear 38. By way of further alternative example, the gearbox 30 may be a differential gearbox in which the ring gear 38 and the planet carrier 34 are both allowed to rotate.

It will be appreciated that the arrangement shown in FIGS. 2 and 3 is by way of example only, and various alternatives are within the scope of the present disclosure. Purely by way of example, any suitable arrangement may be used for locating the gearbox 30 in the engine 10 and/or for connecting the gearbox 30 to the engine 10. By way of further example, the connections (such as the linkages 36, 40 in the FIG. 2 example) between the gearbox 30 and other parts of the engine 10 (such as the input shaft 26, the output shaft and the fixed structure 24) may have any desired degree of stiffness or flexibility. By way of further example, any suitable arrangement of the bearings between rotating and stationary parts of the engine (for example between the input and output shafts from the gearbox and the fixed structures, such as the gearbox casing) may be used, and the disclosure is not limited to the exemplary arrangement of FIG. 2. For example, where the gearbox 30 has a star arrangement (described above), the skilled person would readily understand that the arrangement of output and support linkages and bearing locations would typically be different to that shown by way of example in FIG. 2.

Accordingly, the present disclosure extends to a gas turbine engine having any arrangement of gearbox styles (for example star or planetary), support structures, input and output shaft arrangement, and bearing locations.

Optionally, the gearbox may drive additional and/or alternative components (e.g. the intermediate pressure compressor and/or a booster compressor).

Other gas turbine engines to which the present disclosure may be applied may have alternative configurations. For example, such engines may have an alternative number of compressors and/or turbines and/or an alternative number of interconnecting shafts. By way of further example, the gas turbine engine shown in FIG. 1 has a split flow nozzle 20, 22 meaning that the flow through the bypass duct 22 has its own nozzle that is separate to and radially outside the core engine nozzle 20. However, this is not limiting, and any aspect of the present disclosure may also apply to engines in which the flow through the bypass duct 22 and the flow through the core 11 are mixed, or combined, before (or upstream of) a single nozzle, which may be referred to as a mixed flow nozzle. One or both nozzles (whether mixed or split flow) may have a fixed or variable area. Whilst the described example relates to a turbofan engine, the disclosure may apply, for example, to any type of gas turbine engine, such as an open rotor (in which the fan stage is not surrounded by a nacelle) or turboprop engine, for example. In some arrangements, the gas turbine engine 10 may not comprise a gearbox 30.

The geometry of the gas turbine engine 10, and components thereof, is defined by a conventional axis system, comprising an axial direction (which is aligned with the rotational axis 9), a radial direction (in the bottom-to-top direction in FIG. 1), and a circumferential direction (perpendicular to the page in the FIG. 1 view). The axial, radial and circumferential directions are mutually perpendicular.

In the context of the present invention the provision of an acoustic liner is of relevance, in particular the provision of an acoustic liner arranged in the high-pressure turbine 17 and/or the low pressure turbine 19 of the gas turbine engine.

Figure 4:
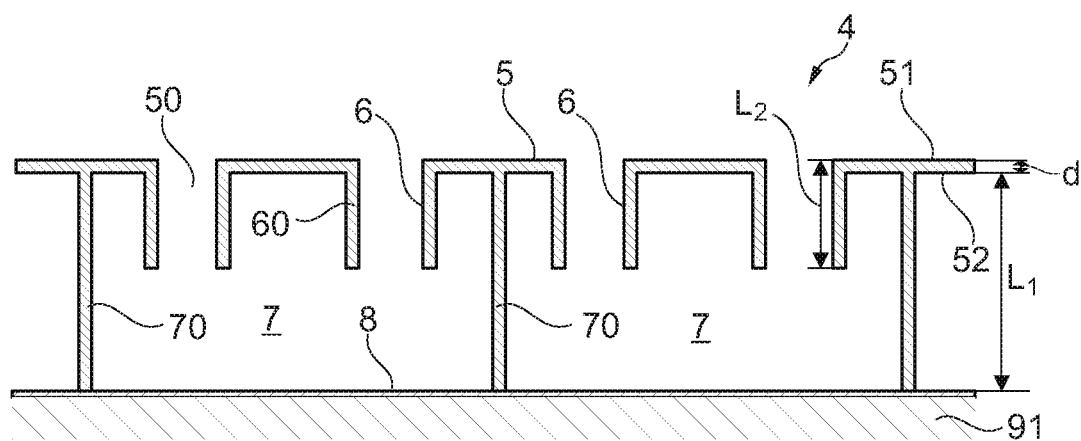
FIG. 4 is a cross-sectional view of an embodiment of an acoustic liner that comprises a facing sheet, a backing sheet and cells sandwiched between the facing sheet and the backing sheet, wherein the facing sheet comprises holes which are surrounded and extended by internal necks.

FIG. 4 shows an embodiment of an acoustic liner 4. The acoustic liner 4 has a sandwich construction with a top facing sheet 5, a bottom backing sheet 8 and a plurality of cells 7 arranged between the facing sheet 5 and the backing sheet 8. The backing sheet 8 may be attached to a further structure 91. The facing sheet 5 is a single layer sheet.

The facing sheet 5 has an upper side 51 and an inner side 52 that faces towards the backing sheet 8. A thickness d of the facing sheet 5 is defined by the distance between the upper side 51 and the inner side 52 of the facing sheet 5. The facing sheet 5 comprises a plurality of holes 50. The holes 50 define a porosity of the facing sheet 5, the porosity being defined by the ratio of the open area of the facing sheet (given by the holes 50) to the complete area of the facing sheet. As will be discussed with respect to FIGS. 7 to 10, a plurality of holes 50 are associated with each cell, wherein typically between three and six holes 50 are associated with each cell 7.

The individual cells 7 are prismatic cells. They may have a hexagonal, square, rectangular, rhombic or other cell structure. The cells 7 form a honeycomb structure. The individual cells 7 are separated by walls 70. Each cell 7 has a cell depth $L_1$ which is defined by the distance between the inner side 51 of the facing sheet 5 and the upper side of the backing sheet 8.

The backing sheet 8 is of rigid nature such that sound waves entering the cells 7 through the holes 50 are reflected by the backing sheet 8.

The acoustic liner 4 further comprises a plurality of internal necks 6. Each neck 6 is located around one of the holes 50 and extends from the inner side 51 of the facing sheet 5 towards the backing sheet 8. The neck 6 has a length which is less than the cell depth $L_1$. The neck 6 increases the longitudinal length $L_2$ of the respective hole 50. The longitudinal length $L_2$ of the respective hole 50 is the sum of the facing sheet thickness d and the length of the neck 6, which is $L_2$ minus d.

As shown in FIG. 4, the neck 6 has a hollow cylindrical wall 60, the cross-section of which is identical to the cross section of the section of the hole 50 that is formed in the facing sheet 5. Accordingly, there is a smooth transition from the section of the hole 50 that is formed in the facing sheet 5 to the section of the hole 50 that is defined by the neck 6.

However, in other embodiments, the inner diameter and/or cross-section of the hole 50 may differ in the section of the hole 50 surrounded by the neck 6 and the section of the hole 50 surrounded by the facing sheet 5. Also, the form of the neck 6 may be different from a hollow cylindrical form. The lower edge of the neck 6 may be rounded.

In an embodiment, the acoustic liner 4 has been manufactured by 3D printing. In particular, the neck 6 has been 3D printed together with the facing sheet 5, the walls 70 of the cells 7 and the backing sheet 8. This allows for an exact placement of the neck 6 at the inner side 52 of the facing sheet 5. In alternative embodiments, the acoustic liner 4 may be manufactured by metal injection molding and sintering.

By providing an extended length $L_2$ of the hole 50, the column of air in the hole 50 is also increased, thereby reducing the resonance frequency of the cell 7. This is achieved without the necessity to increase the depth $L_1$ of the cells 7 and without increasing the facing sheet thickness d.

Figure 5:
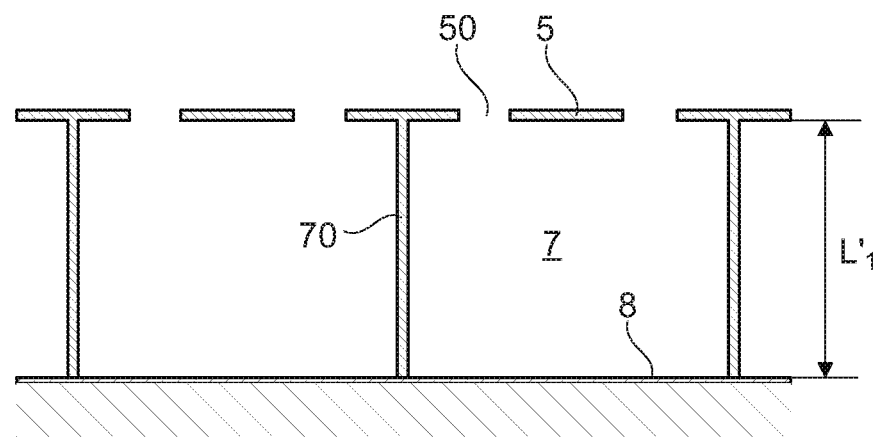
FIG. 5 is a first alternative example of an acoustic liner.
Figure 6:
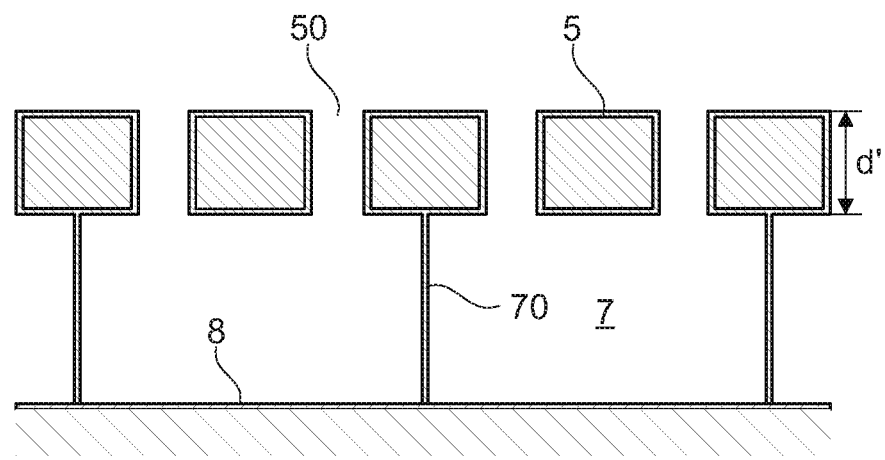
FIG. 6 is a second alternative example of an acoustic liner.

FIGS. 5 and 6 show two alternative examples which implement a different structure to achieve a resonance frequency comparable to that of the embodiment of FIG. 4. In FIG. 5, the cell depth $L_1'$ has been increased to be longer than the cell length $L_1$ of FIG. 4. This is associated with the disadvantage of a larger overall thickness of the liner. In FIG. 6, the facing sheet thickness d' has been increased to provide for a comparable longitudinal length of the holes 50. This is associated with the disadvantage of requiring both a thicker facing sheet 5 and a larger overall thickness of the liner.

It is pointed out that FIG. 4 is a schematic cross-sectional view of an acoustic liner 4 and that the dimensions of a manufactured acoustic liner and its components may be different.

FIGS. 7 to 10 show different embodiments of an acoustic liner which differ in the form of the acoustic cells 7 and the number and arrangement of the holes 50.

Figure 7:
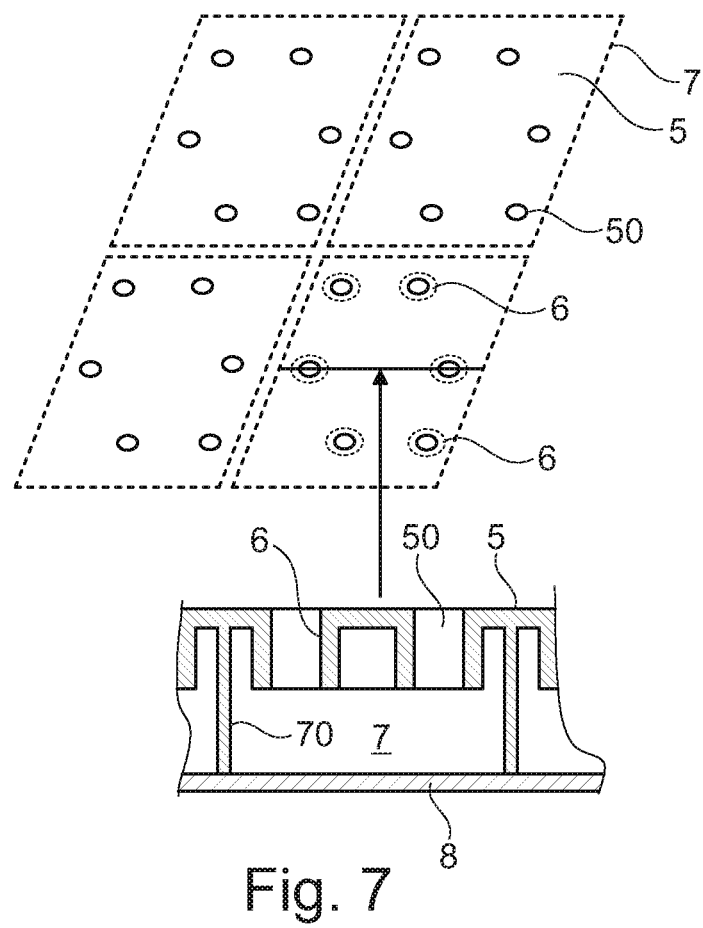
FIG. 7 is a schematic view from above of an acoustic liner having a facing sheet that comprises holes that are associated with cells covered by the facing sheet, wherein the cells have a rhombic form, and further is a cross-sectional view of a cell of such acoustic liner.

In the embodiment of FIG. 7, the cells 7 are rhombic cells and each cell is associated with six holes 50 in the facing sheet 5, the six holes 50 being arranged in a hexagonal manner. The holes 50 are each provided with an internal neck 6. FIG. 7 also shows a cross-sectional view of one of the cells 7 along the line indicated in FIG. 7. The cross-sectional structure is identical to that discussed with respect to FIG. 4.

Figure 8:
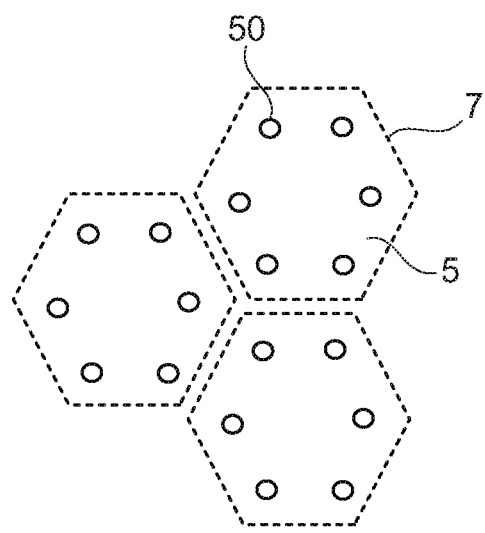
FIG. 8 shows an alternative pattern for arranging the cells of the acoustic liner and holes in the facing sheet associated with the cells, wherein the cells are hexagonal and each associated with six holes.

In the embodiment of FIG. 8, the cells 7 are hexagonal cells and each cell is associated with six holes 50 in the facing sheet 5, the six holes 50 also being arranged in a hexagonal manner.

Figure 9:
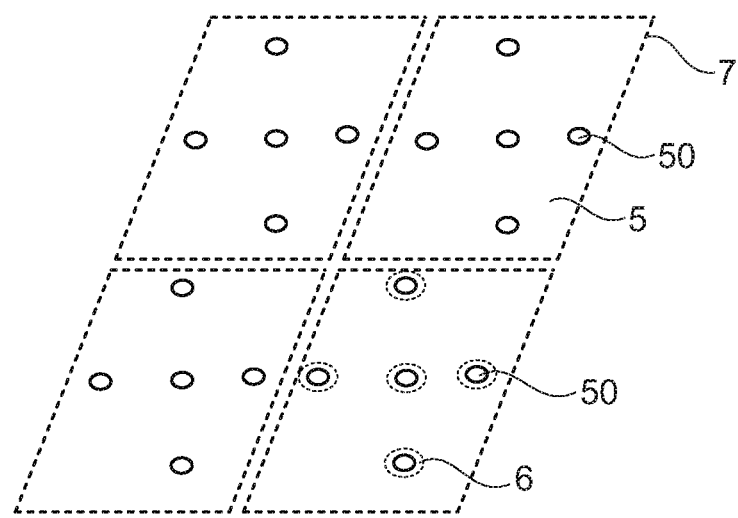
FIG. 9 is a further alternative pattern for arranging the cells of the acoustic liner and holes in the facing sheet associated with the cells, wherein the cells are rhombic and each associated with five holes.

In the embodiment of FIG. 9, the cells are rhombic cells as in FIG. 7, wherein each cell is associated with five holes 50 in the facing sheet 5, the five holes 50 being arranged in a cross-like manner.

Figure 10:
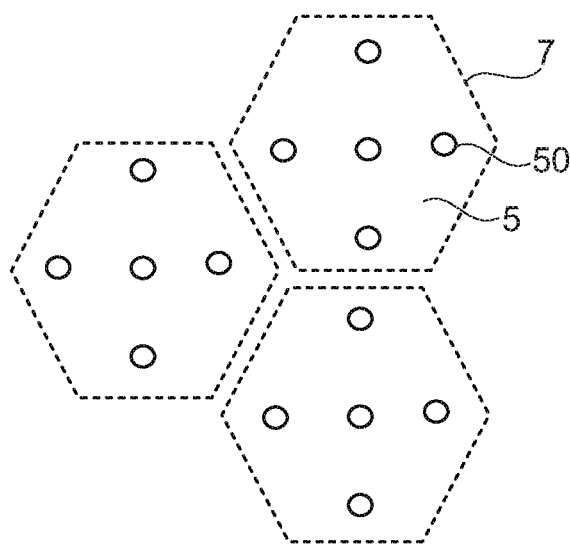
FIG. 10 is a still further alternative pattern for arranging the cells of the acoustic liner and holes in the facing sheet associated with the cells, wherein the cells are hexagonal and each associated with five holes.

In the embodiment of FIG. 10, the cells are hexagonal cells and each cell is associated with five holes 50 in the facing sheet 5, the five holes being arranged in a cross-like manner.

In each of these embodiments, the holes 50 are provided with internal necks 6 as discussed with respect to FIG. 4.

In the following, several examples are given for combinations of parameters that an acoustic liner 4 built in accordance with FIG. 4 may implement.

According to a first embodiment, the porosity of the facing sheet 5 is 2.5 percent. The facing sheet thickness d is 0.5 millimeter. The diameter of the holes 50 is 0.8 millimeter. The length of the neck 6 is 0.1 millimeter. The cell depth $L_1$ is 3 millimeter. The cell diameter is 11 millimeter. The wall thickness of the honeycomb walls 70 is 0.12 millimeter. This leads to an overall thickness of the liner of about 4 millimeter. The number of holes per cell may be 5 or 6. Such acoustic liner has a resonance frequency of about 4.3 kHz.

In a second embodiment, the length of the neck 6 is increased to 0.5 millimeter. This results in a decreased resonance frequency of about 3.8 kHz.

In a third embodiment, the length of the neck 6 is increased to 1 millimeter. This results in a further decreased resonance frequency of about 3.25 kHz.

In a fourth embodiment, the length of the neck 6 is increased to 1.5 millimeter. This results in a further decreased resonance frequency of about 2.9 kHz.

It is pointed out that the measurements of the resonance frequency in the first to fourth embodiments discussed above were carried out in a cold condition. In the hot gas of a low-pressure turbine the sound velocity is about 600 m/s, compared to about 343 m/s at 20° C. Accordingly, it can be assumed that in the hot temperature condition the resonance frequencies are about 1.75 times larger, thus ranging from about 7.5 kHz in the first embodiment to 5.1 kHz in the fourth embodiment, this showing the effect of an increased neck length to reduce the resonance frequency.

According to a fifth embodiment, the porosity of the facing sheet 5 is 3.5 percent. The facing sheet thickness d is 0.5 millimeter. The diameter of the holes 50 is 0.8 millimeter. The length of the neck 6 is 1.5 millimeter. The cell depth $L_1$ is 3 millimeter. The cell diameter is 11 millimeter. The wall thickness of the honeycomb walls 70 is 0.12 millimeter. This leads to an overall thickness of the liner of about 4 millimeter. The number of holes per cell may be 5 or 6. Such acoustic liner has a resonance frequency of about 3.6 kHz in a cold condition.

Figure 11:
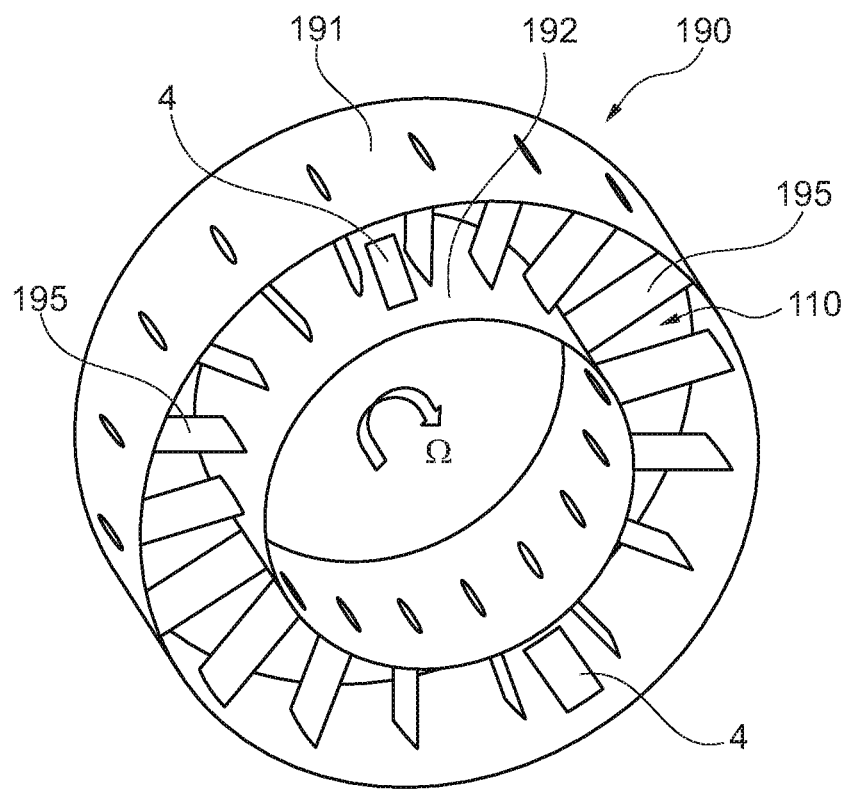
FIG. 11 is a perspective view of an embodiment of a static turbine section which comprises an inner casing and outer casing which limit the main gas path through the turbine, and further comprises airfoils extending between the inner casing and the outer casing.
Figure 12:
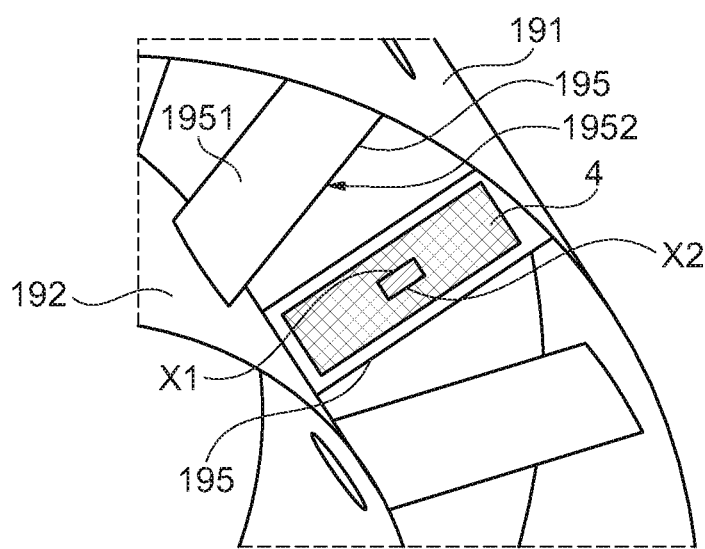
FIG. 12 is an enlarged view of the turbine section of FIG. 11, wherein an acoustic liner is attached to one side of the airfoil.

FIGS. 11 and 12 discuss locations in a gas turbine engine in which the acoustic liner of FIG. 4 may be arranged. FIG. 11 shows a section of a low-pressure turbine such as of the low-pressure turbine 19 of FIG. 1. The section that is shown is a static (non-rotating) section 190 which comprises a static outer casing 191 and a static inner casing 192. Between the inner casing 192 and the outer casing 191 runs the main flow path 110 of the core engine. A plurality of airfoils 195 extend in the radial direction through the main flow path 110 between the inner casing 192 and the outer casing 191. For example, the airfoils 195 are guide vanes, in particular outlet guide vanes of the low-pressure turbine. In other embodiments, the airfoils may be struts that carry loads between the inner casing 192 and the outer casing 191. Also, it may be provided that guide vanes at least partly also fulfill the function of struts.

As schematically depicted, acoustic liners 4 having a structure as discussed with respect to FIG. 4 may be arranged on the inner casing 192 and/or the outer casing 191 facing the main flow path 110.

FIG. 12 shows a detail of the low-pressure turbine section of FIG. 11 showing the inner casing 192, the outer casing 191, the main flow path 110 and several airfoils 195. The airfoils 195 each have a pressure side 1951 and a section side 1952. In the embodiment of FIG. 12, an acoustic liner 4 with a structure as discussed with respect to FIG. 4 is attached to the pressure side 1951 of at least one airfoil 195. In addition, or alternatively, the acoustic liner 4 may be attached to the suction side 1952 of the airfoil 195. The acoustic liner 4 may, e.g., be welded, bolted or glued to the airfoil 195.

Figure 13:
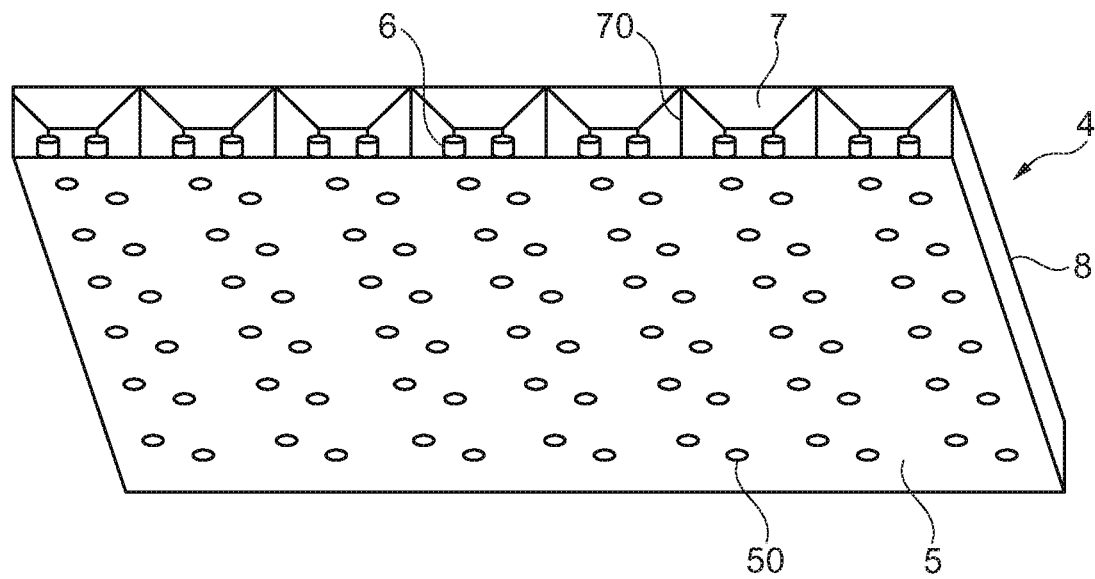
FIG. 13 is an enlarged perspective view of the acoustic liner of FIG. 12 from the top.

FIG. 13 is a perspective enlarged view of a section of the acoustic liner 4 of FIG. 12, in accordance with reference numeral X1 of FIG. 12, wherein the view is onto the facing sheet 5. Between the facing sheet 5 and the backing sheet 8 a plurality of hexagonal cells 7 with walls 70 are implemented. Holes 50 in the facing sheet are extended by means of internal necks 6 as discussed with respect to FIG. 4.

Figure 14:
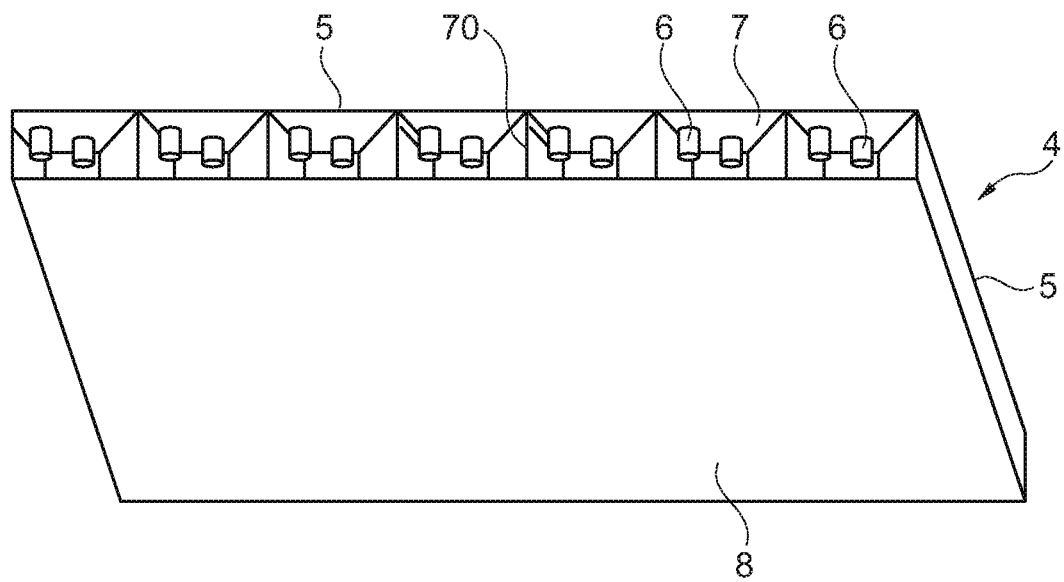
FIG. 14 is an enlarged perspective view of the acoustic liner of FIG. 12 from the bottom.

FIG. 14 is a perspective enlarged view of a section of the acoustic liner 4 of FIG. 12, in accordance with reference numeral X2 of FIG. 12, wherein the view is onto the backing sheet 8. In FIG. 14, the necks 6 formed as hollow cylindrical structures that extend from the underside of the facing sheet 5 are well shown.

In the embodiment of FIGS. 12 to 14, the facing sheet 5 with holes 50 is facing towards the main gas path 110.

In an alternative embodiment, the acoustic liner 4 that is attached to at least one airfoil 195 may be any liner and is not necessarily a liner as shown in FIG. 4.

Figure 15:
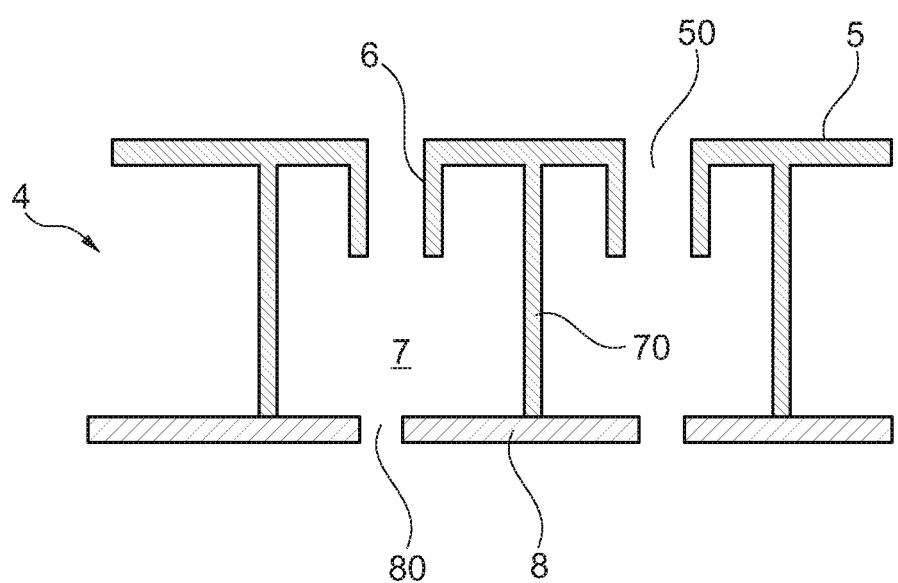
FIG. 15 is a cross-sectional view of a further embodiment of an acoustic liner similar to the embodiment of FIG. 4, wherein addition holes are provided in the backing sheet.

FIG. 15 shows a further embodiment of an acoustic liner 4 that includes necks 6 which are located around holes 50 in the facing sheet 5. The difference with respect to the embodiment of FIG. 4 lies in that the backing sheet 8 also comprises holes 80. These holes 80 are provided and configured to be able to remove powder from the cells 7 left during manufacture of the acoustic liner 4 by 3D printing. In an embodiment, all elements of the acoustic liner 4 including the facing sheet 5, the necks 6, the cell walls 70 and the backing sheet 8 are produced in one manufacturing process by 3D printing.

It should be understood that the above description is intended for illustrative purposes only and is not intended to limit the scope of the present disclosure in any way. Also, those skilled in the art will appreciate that other aspects of the disclosure can be obtained from a study of the drawings, the disclosure and the appended claims. All methods described herein can be performed in any suitable order unless otherwise indicated herein or otherwise clearly contradicted by context. Various features of the various embodiments disclosed herein can be combined in different combinations to create new embodiments within the scope of the present disclosure. In particular, the disclosure extends to and includes all combinations and sub-combinations of one or more features described herein. Any ranges given herein include any and all specific values within the range and any and all sub-ranges within the given range.

What is claimed is:

1. An acoustic liner which comprises:
    a facing sheet that comprises holes, the facing sheet having a porosity and a facing sheet thickness,
    a backing sheet,
    a plurality of cells arranged between the facing sheet and the backing sheet, the cells each having a cell depth and each cell defining a cavity,
    a plurality of internal necks beginning at the facing sheet and extending from an inner side of the facing sheet towards the backing sheet but ending prior to reaching the backing sheet so that lengths of the internal necks are less than the cell depth and the internal necks are spaced a distance from the backing sheet, each of the internal necks being located around a respective one of the holes of the facing sheet, thereby extending a longitudinal length of the hole, wherein the acoustic liner is adapted to have a peak attenuation at a frequency in a range between 4,000 Hz and 8,000 Hz in a temperature condition in which a sound velocity is 600 m/s, wherein the cell depth of the cells is in a range between 2 mm and 5 mm, wherein each of the internal necks has a length in a range between 0.1 mm and 2 mm, wherein the facing sheet including the internal necks, walls of the cells and the backing sheet are formed as one part, manufactured by 3D printing;

wherein each of the holes has a closed perimeter;

wherein each of the holes in the facing sheet includes a respective one of the internal necks;

wherein each cell of the acoustic liner is connected with a defined plurality of the holes in the facing sheet and the defined plurality of internal necks respectively surrounding the defined plurality of holes;

wherein the facing sheet is an outermost element of the acoustic liner facing a volume to be attenuated;

wherein the facing sheet defines an outermost boundary of the cells;

wherein the facing sheet forms an outer portion of each of the internal necks;

wherein the facing sheet is monolithic with each of the internal necks.

2. The acoustic liner of claim 1, wherein the facing sheet has a porosity in a range between 1% and 4%.

3. The acoustic liner of claim 1, wherein the facing sheet thickness is in a range between 0.3 and 2 mm.

4. The acoustic liner of claim 1, wherein the holes each have a diameter in a range between 0.1 mm and 1.6 mm.

5. The acoustic liner of claim 4, wherein the holes each have a diameter equal to or smaller than 1.0 mm.

6. The acoustic liner of claim 1, wherein each of the internal necks has a hollow cylindrical form.

7. The acoustic liner of claim 1, wherein a diameter of each of the cells is in a range between 5 mm and 20 mm.

8. The acoustic liner of claim 1, wherein an overall thickness of the acoustic liner, including the facing sheet thickness and a thickness of the backing sheet, is in a range between 2 mm and 6 mm.

9. The acoustic liner of claim 1, wherein the cells are arranged in a honeycomb structure, wherein the walls of the cells of the honeycomb structure have a wall thickness in a range between 0.05 and 0.5 mm.

10. The acoustic liner of claim 9, wherein the backing sheet comprises holes each having a size which is adapted to remove powder from the cells produced during the 3D printing.

11. The acoustic liner of claim 1, wherein the defined plurality of holes in the facing sheet includes three or more holes per each cell.

12. The acoustic liner of claim 1, wherein the facing sheet is a single layer facing sheet.

13. The liner of claim 1, wherein the range of the cell depth of the cells is between 2.5 and 3.5 mm and the length of the each of the internal necks is between 1 mm and 1.4 mm.

14. The liner of claim 1, wherein the range of peak attenuation is between 6,001 Hz and 8,000 Hz in the temperature condition in which the sound velocity is 600 m/s.

15. A gas turbine engine for an aircraft comprising:

an engine core comprising a compressor, a combustion equipment, and a turbine, and an acoustic liner attached to at least one surface of the turbine, the acoustic liner comprising:

a facing sheet that comprises holes, the facing sheet having a porosity and a facing sheet thickness, a backing sheet, a plurality of cells arranged between the facing sheet and the backing sheet, the cells each having a cell depth and each cell defining a cavity, a plurality of internal necks beginning at the facing sheet and extending from an inner side of the facing sheet towards the backing sheet but ending prior to reaching the backing sheet so that lengths of the internal necks are less than the cell depth and the internal necks are spaced a distance from the backing sheet, each of the internal necks being located around a respective one of the holes of the facing sheet, thereby extending a longitudinal length of the hole, wherein the cell depth of the cells is in a range between 2 mm and 5 mm, wherein each of the internal necks has a length in a range between 0.1 mm and 2 mm, wherein the acoustic liner is adapted to have a peak attenuation at a frequency in a range between 4,000 Hz and 8,000 Hz in a temperature condition in which a sound velocity is 600 m/s, wherein the facing sheet including the internal necks, the walls of the cells and the backing sheet are formed as one part, manufactured by 3D printing;

wherein each of the holes has a closed perimeter;

wherein each of the holes in the facing sheet includes a respective one of the internal necks;

wherein each cell of the acoustic liner is connected with a defined plurality of the holes in the facing sheet and the defined plurality of internal necks respectively surrounding the defined plurality of holes; and wherein the facing sheet is an outermost element of the acoustic liner facing a volume to be attenuated;

wherein the facing sheet defines an outermost boundary of the cells;

wherein the facing sheet forms an outer portion of each of the internal necks;

wherein the facing sheet is monolithic with each of the internal necks.

16. The gas turbine engine of claim 15, wherein the acoustic liner is attached to guide vanes or struts of the turbine.

17. The gas turbine engine of claim 15, wherein the acoustic liner is attached to an annular structure surrounding a main gas path through the turbine.

* * * * *